(12) United States Patent
Goode et al.

(10) Patent No.: US 7,069,575 B1
(45) Date of Patent: Jun. 27, 2006

(54) SYSTEM FOR INTERACTIVELY DISTRIBUTING INFORMATION SERVICES

(75) Inventors: Chrostopher W. B. Goode, Menlo Park, CA (US); Tobie J. LaRocca, San Jose, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 891 days.

(21) Appl. No.: 09/697,269

(22) Filed: Oct. 26, 2000

Related U.S. Application Data

(60) Division of application No. 09/322,814, filed on May 28, 1999, now Pat. No. 6,166,730, which is a continuation-in-part of application No. 08/984,710, filed on Dec. 3, 1997, now Pat. No. 6,253,375.

(60) Provisional application No. 60/034,489, filed on Jan. 13, 1997.

(51) Int. Cl.
*H04N 7/173* (2006.01)

(52) U.S. Cl. .............................. 725/86; 725/87; 725/91; 725/93; 725/97; 725/100; 725/102

(58) Field of Classification Search ................. 725/87, 725/88, 91, 93, 86, 97, 100, 102
See application file for complete search history.

(56) References Cited

U.S. PATENT DOCUMENTS

| | | | |
|---|---|---|---|
| 4,430,731 A | 2/1984 | Gimple et al. ................. 370/30 |
| 4,509,073 A | 4/1985 | Baran et al. .................... 358/86 |
| 4,573,072 A | 2/1986 | Freeman ....................... 358/86 |
| 4,602,279 A | 7/1986 | Freeman ....................... 358/86 |
| 4,623,920 A | 11/1986 | Dufresne et al. ........... 358/122 |
| 4,763,317 A | 8/1988 | Lehman et al. ................ 370/58 |
| 4,769,833 A | 9/1988 | Farleigh et al. ............. 379/105 |
| 4,792,849 A | 12/1988 | McCalley et al. ............. 358/86 |
| 5,014,125 A * | 5/1991 | Pocock et al. ................. 725/93 |
| 5,070,400 A * | 12/1991 | Lieberman .................... 725/151 |
| 5,165,091 A | 11/1992 | Lape et al. ..................... 370/79 |
| 5,172,413 A | 12/1992 | Bradley et al. ............... 380/20 |
| 5,181,106 A | 1/1993 | Sutherland .................... 358/86 |
| 5,182,640 A | 1/1993 | Takano .......................... 358/86 |
| 5,235,619 A | 8/1993 | Beyers, II et al. ............ 375/38 |
| 5,247,347 A | 9/1993 | Litteral et al. ................. 358/85 |
| 5,303,229 A | 4/1994 | Withers et al. ............. 370/58.1 |
| 5,357,276 A * | 10/1994 | Banker et al. ............... 725/102 |
| 5,359,601 A | 10/1994 | Wasilewski et al. ........... 370/73 |
| 5,400,402 A * | 3/1995 | Garfinkle ..................... 380/231 |
| 5,410,343 A | 4/1995 | Coddington et al. ........... 348/7 |
| 5,461,415 A * | 10/1995 | Wolf et al. .................... 725/88 |
| 5,481,542 A | 1/1996 | Logston et al. ............. 370/94.2 |
| 5,485,197 A | 1/1996 | Hoarty ............................ 348/7 |
| 5,530,754 A | 6/1996 | Garfinkle ........................ 380/5 |
| 5,550,576 A | 8/1996 | Klosterman ..................... 348/6 |
| 5,583,560 A | 12/1996 | Florin et al. ................. 348/348 |
| 5,586,264 A | 12/1996 | Belknap et al. ......... 395/200.08 |
| 5,671,217 A | 9/1997 | Adams et al. ............... 370/233 |
| 5,914,712 A * | 6/1999 | Sartain et al. ................. 725/9 |
| 5,928,327 A * | 7/1999 | Wang et al. ................... 725/88 |
| 6,064,380 A * | 5/2000 | Swenson et al. ......... 715/500.1 |
| 6,065,050 A * | 5/2000 | DeMoney .................... 709/219 |
| 6,078,348 A * | 6/2000 | Klosterman et al. .......... 725/40 |
| 6,166,730 A * | 12/2000 | Goode et al. ................ 715/716 |

(Continued)

*Primary Examiner*—Kieu-Oanh Bui
(74) *Attorney, Agent, or Firm*—Patterson & Sheridan LLP

(57) ABSTRACT

In an interactive information distribution system that utilizes open sessions to provide requested information to users, a method for sharing the use of open sessions between a plurality of set top terminals associated with a common account number or user.

19 Claims, 12 Drawing Sheets

U.S. PATENT DOCUMENTS 6,219,355 B1 * 4/2001 Brodigan .................... 370/486
6,253,375 B1 * 6/2001 Gordon et al. ................ 725/88
6,543,053 B1 * 4/2003 Li et al. ...................... 725/88
2002/0059581 A1 * 5/2002 Billock et al. ............... 725/25

* cited by examiner

| DCU TABLE | 630 |
|---|---|
| ACCOUNT NUMBER | 631 |
| SERIAL NUMBER | 632 |
| OTHER DATA | 633 |

| SESSION TABLE | 620 |
|---|---|
| ACCOUNT NUMBER | 621 |
| SESSION NUMBER | 622 |
| USE TIME | 623 |
| VIEW TIME | 624 |
| POSITION | 625 |
| OTHER DATA | 626 |

| SUBSCRIBER TABLE | 610 |
|---|---|
| ACCOUNT NUMBER | 611 |
| NAME | 612 |
| OTHER DATA | 613 |

SYSTEM FOR INTERACTIVELY DISTRIBUTING INFORMATION SERVICES

CROSS REFERENCE TO RELATED APPLICATIONS

This application is a divisional of commonly assigned U.S. patent application Ser. No. 09/322,814, filed May 28, 1999 now U.S. Pat. No. 6,166,730 issued Dec. 26, 2000, which is a continuation-in-part of commonly assigned U.S. patent application Ser. No. 08/984,710, filed Dec. 3, 1997 now U.S. Pat. No. 6,253,375, issued Jun. 26, 2001; both such applications are incorporated herein by reference in their entireties. Application Ser. No. 08/984,710, filed Dec. 3, 1997 now U.S. Pat. No. 6,253,375, issued Jun. 26, 2001, claims the benefit of U.S. provisional patent application Ser. No. 60/034,489, filed Jan. 13, 1997, the disclosure of which is herein incorporated by reference.

BACKGROUND OF THE INVENTION

1. Field of the Invention

The present invention relates to a system for delivering interactive information services, such as video, audio, library, interactive games, and the like to one or more subscribers. More particularly, the invention relates to a system for establishing a multi-channel communicative connection between a subscriber's set top terminal and a service provider and then managing the communications necessary to deliver interactive information services to the subscriber(s).

2. Description of the Background Art

Recent advances in digital signal processing techniques and, in particular, advancements in digital compression techniques, have led to a plethora of proposals for providing new digital services to a subscriber's home via existing telephone and coaxial cable networks. For example, it has been proposed to provide hundreds of cable television channels to subscribers by compressing digital video, transmitting the compressed digital video over conventional coaxial cable television cables, and then decompressing the video at the subscriber's set top terminal. Another proposed application of this technology is a movie-on-demand video system in which a subscriber communicates directly with a video service provider via telephone lines to request a particular video program from a video library and the requested video program is routed to the subscriber's home via telephone lines or via the coaxial television cables for immediate viewing.

However, these present movie-on-demand video systems are not truly interactive systems wherein a subscriber can selectively access a large audio, video or data library and control the presentation of the selected information on a real-time basis, as when a video program is played using a video cassette recorder (VCR). Most of the presently available systems have a simple control interface that permits subscribers to merely order information without any further control of the presentation of the information. Other, more sophisticated systems, have a control interface that contains more complex commands such as start, stop, pause, fast-forward and rewind to permit rudimentary control of the presentation of the information. However, these systems use conventional signaling and information routing networks that are relatively slow to react to the commands, e.g., the latency between the instant an interactive function is requested and when that function takes effect is extremely long. Furthermore, the set top terminals used by these systems contain complex and costly electronics to facilitate processing of the complex commands. Additionally, these systems use a conventional cable television network architecture, where a central data server transmits data to a plurality of head end subsystems which in turn propagate the data to a plurality of set top terminals. The servers in such systems perform all of the control functions and, as such, the latency arising from sending control commands through the head end to the server is substantial.

Therefore, there is a need in the art for a cost effective, interactive information distribution system that provides real-time interaction (with relatively short latency) between the subscriber and the service provider at any time during the presentation of requested information.

SUMMARY OF THE INVENTION

The disadvantages heretofore associated with the prior art are overcome by the present invention. The present invention utilizes a system for interactively distributing information services. The system contains an information server, a video session manager, a bi-directional cable transport network, and subscriber equipment (e.g., a set top terminal, an input device, and a display device). The present invention provides functionality to the system such that multiple set top terminals within, e.g., a single household, may be used to contemporaneously view or present a requested movie or other information stream.

In an interactive information distribution system that utilizes open sessions to provide requested information to users, a method for sharing the use of such open sessions between a plurality of set top terminals associated with a common account number or user.

BRIEF DESCRIPTION OF THE DRAWINGS

The teachings of the present invention can be readily understood by considering the following detailed description in conjunction with the accompanying drawings, in which:

FIG. 6 depicts a plurality of data objects useful in understanding the invention;

DETAILED DESCRIPTION

The invention is a cost effective, interactive information distribution system that provides a plurality of subscribers with information such as multimedia programming, audio, video, graphics, and the like. This information is available in an "on demand" basis. Furthermore, the system enables subscribers to control, in real-time, the presentation of the information, e.g., requested stream can be started, stopped, paused, reversed and fast forwarded without substantial latency.

The system as a whole is discussed below in summary fashion. Thereafter, each inventive component subsystem of the inventive system is individually discussed in detail.

A. System Overview

Figure 1:
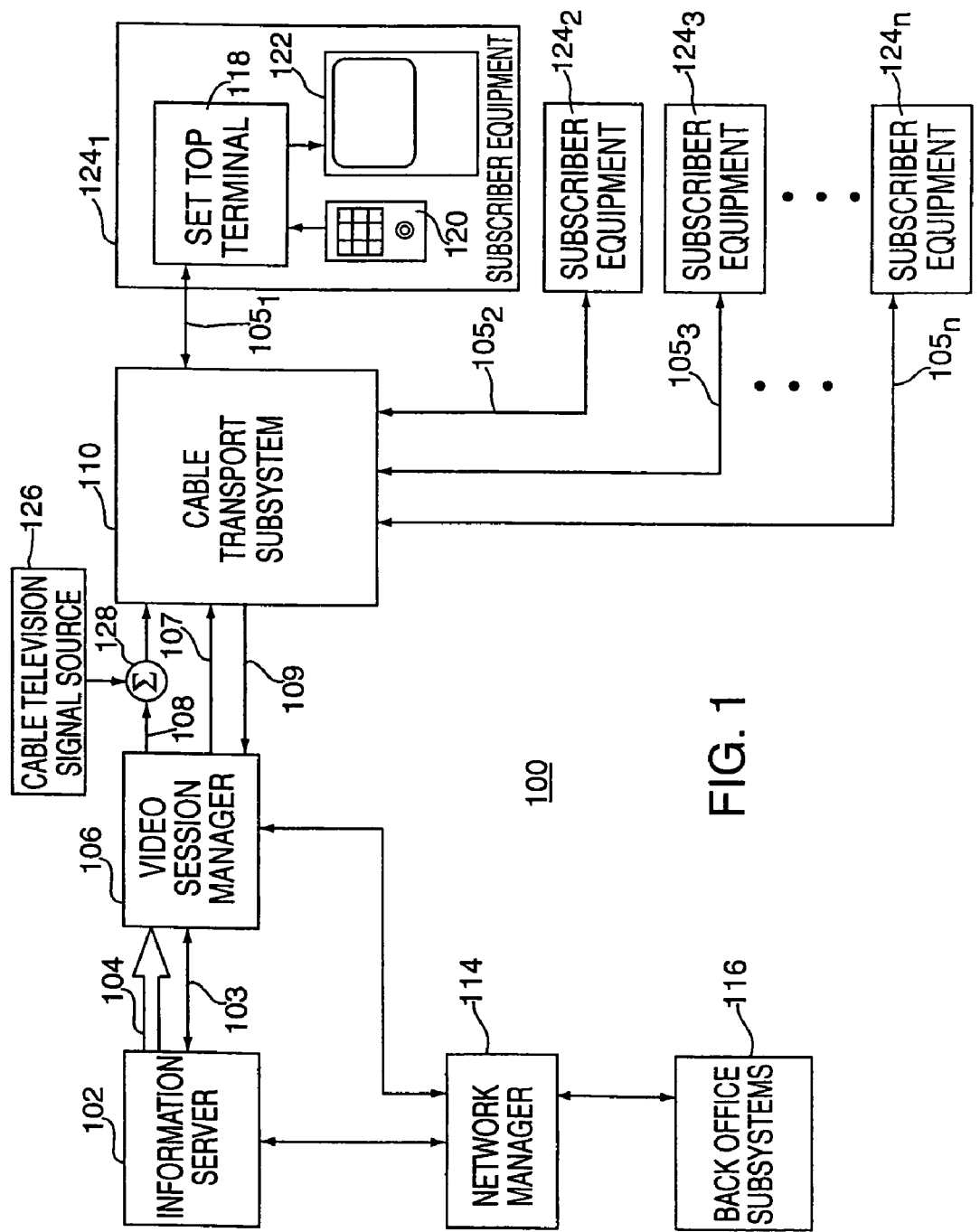
FIG. 1 depicts a high-level block diagram of an interactive information distribution system in accordance with the present invention.

FIG. 1 is high-level block diagram of the interactive information distribution system 100 of the present invention. The system contains an information server 102, at least one video session manager 106, a network manager 114, back office subsystems 116, a cable transport network 110, and a plurality of subscriber equipment 124. The subscriber equipment 124 includes a set top terminal 118, an input device (e.g., a remote control 120) and a display device 122.

The information server 102 provides a plurality of packetized data streams, via path 104, and a synchronization clock signal, via path 103, to one or more video session managers 106 (only one of which is shown). Alternatively, the plurality of data streams is multiplexed onto an optical fiber (a trunk) and each video session manager is connected to the trunk by a "drop line". The number of video session managers is proportional to the number of subscribers being serviced by the system, e.g., each video session manager can generally service up to 2000 subscribers. The server 102 provides information (data streams) in response to specific information requests from the video session manager that are communicated to the server through the bus 112. The video session manager performs various system command and control functions as well as communicates the data streams to the cable network. As such, the system uses three independent communication channels to perform control and communication operations.

Specifically, the video session manager modulates each of the baseband data streams onto a carrier signal and upconverts the signal to a transmission frequency that complies with conventional cable television (CATV) frequency spectrum. Illustratively, the downstream data modulation is, for example, 64-ary quadrature amplitude modulation (QAM) and the transmission frequency is in the range 50 to 750 MHz. Other modulation types and frequency bands may be used. This information is coupled to the cable network via path 108 and is carried through the cable network on what is referred to as the information channel.

The video session manager 106 also transmits control information through a downstream command channel (path 107) contained within the cable transport network 110 to the subscriber equipment 124. This command and control information is transmitted on a carrier in the range 50 to 750 MHz using a 1 MHz bandwidth, e.g., the command information is frequency multiplexed with the information channel and transmitted through the network 110. Furthermore, the subscriber equipment 124 communicates via a reverse (or back) channel to the video session manager 106 through the cable transport network 110 and the reverse channel path 109. There are typically 16 such reverse channels supported by each video session manager. Each reverse channel carries, for example, a BPSK modulated signal on a carrier in the range 5–42 MHz, where the channel capacity is approximately 64 kbps. Other frequency ranges, modulation types or channel capacities may be used.

In addition to the information that can be interactively manipulated, the system provides for communication of conventional cable television signals (analog signals) to the subscriber equipment. Specifically, a conventional cable signal source 126 (e.g., a conventional cable head end) is coupled to one input of a signal summer 128. The other input of summer 128 is coupled to path 108 from the video session manager 106. As such, the conventional cable signals propagate to the subscriber equipment to supplement the interactive information provided by the service provider.

The cable transport network is a conventional bi-directional hybrid fiber-coax cable network. Depending upon the fiber node size, the invention requires between two and five available conventional cable channels (e.g., 6 MHz bandwidth channels) to effectively provide service to approximately 2000 subscribers. In addition to the downstream information channels, the network must also support the downstream command channel and the upstream "back" channel.

The subscriber equipment 124 contains a set top terminal 118, an input device 120, and a display device 122. The set top terminals 118 receive and demodulate the downstream signals including those propagated through both the command channel and the information channel. The set top terminals also optionally demodulate standard cable television signals received from the network. Thus, a single set top terminal can be used to receive all the cable services provide by the network. The set top terminals also provide interactive control of the information presentation. The presentation is controlled via the input device 120, e.g., an infrared (IR) or radio frequency (RF) remote control unit. The information, e.g., audio, video, still photographs, graphics, multimedia programs and the like are portrayed on the display device 122 such as a television, video monitor, and the like.

The network manager 114 manages the system assets, provides security measures, and ensures synchronization of all system components. The network manager communicates with all the system components via a communication bus architecture 112. This bus may be implemented using a conventional VME communications bus architecture. The network manager 114 also communicates with the back office subsystems 116 that maintain the subscriber account management software. This software performs billing and accounting functions to correlate the subscriber identification numbers with information resources that are requested and the price of that information resource. Such back office systems do not form any part of the present invention; therefore, this system component will not be discussed any further, but is mentioned here for completeness.

In operation, each set top terminal is assigned a unique identification code and each subscriber has a defined personal identification number (PIN). The PINs may be allocated by family or by family member, e.g., children can have different PINs than parents. PIN allocation and management is disclosed in commonly assigned U.S. patent application Ser. No. 08/738,343 filed Oct. 25, 1996 and incorporated herein by reference.

To the subscriber, the default system signal appears on the subscriber's television as one channel in the plurality of cable channels available to the customer. The default signal is presented as a "system barker" which invites a viewer to subscribe to the service or, at least, browse through a number of available information offerings. The system barker is continuously broadcast to all subscribers and potential subscribers.

If interested, the viewer selects entry into the system by manipulating the buttons (or joystick) of the remote control 120. During the selection process, the viewer (now a potential subscriber) is presented with an on-screen browser (a graphical interface generally known as a navigator) that aids the viewer in finding information, the prices of the selections, search aides, and the like. The commands used to navigate throughout the various menus are transmitted from the set top terminal to the video session manager via the back channel. The video session manager responds to customer commands via the downstream command and information channels. When the subscriber executes the navigator, the video session manager opens a session for that particular subscriber.

Once a program, for example, a movie, is selected for viewing, the video session manager 106 associates the selected program with the open session for that particular subscriber. The subscriber PIN is requested and checked against a PIN database managed by the network manager 114. Also, the set top terminal ID (TID) is checked against a database of terminal IDs to ensure that the request is being made from an authorized terminal. Each program that is available has a unique identification number or PID. Thus, when a program is requested, the video session manager 106 sends the PID to the server 102 along path 105. As such, the server recalls the program from memory and provides the requested information to the video session manager as a packetized data stream. The data stream packets are addressed to the appropriate TID and carry the PID for the requested program. The video session manager processes the data streams for transmission onto the cable network and the set top terminal retrieves all the packets addressed to its TID. The set top terminal decodes and decompresses the data for presentation to the subscriber.

At any time during the presentation of the requested information, the subscriber may request special functions be performed. For example, the subscriber can begin another session, temporarily stopping the previous session. Additionally, the customer may stop, pause, rewind, or fast forward the information. The subscriber may leave the system and return later to watch the program from the location where the subscriber interrupted the program. Each of these functions is accomplished by manipulating the remote control. The set top terminal sends the control information via the back channel to the video session manager. The video session manager informs the server of the control command for implementation as well as informs the network manager of the command so that billing can be appropriately altered. In this manner, a subscriber is provided a real-time, fully functional information-on-demand system.

One important feature of the invention that allows for such system flexibility is end-to-end system synchronization. To facilitate end-to-end synchronization, the server uses a high accuracy (level 1) clock signal as a reference signal for all server timing. As such, all the data streams are synchronized to the reference signal (synchronization clock signal). Additionally, the reference signal is supplied (path 103) along with the data streams to the video session manager. The video session manager uses a single oscillator source that is phase-locked to the reference signal to modulate all the data streams such that the streams remain synchronized. The streams carry timing data via synchronized data transitions to the set top terminals such that each set top terminal is synchronized to a stream then being received. Since all streams are synchronized with one another, the set-top terminals can seamlessly switch from one stream to another without incurring a timing error, i.e., resynchronization is not necessary.

The following discusses each of the component subsystem blocks of the system in detail.

B. The Server 102

The server 102 is typically a parallel processing computer system capable of accepting information requests from the video session manager 106, recalling that information from memory and generating a plurality of program streams containing the information. One such server is the SARNOFF SERVER computer system manufactured by DIVA Systems Corporation of Menlo Park, Calif. SARNOFF SERVER is a trademark of DIVA Systems Corporation of Menlo Park, Calif. The SARNOFF SERVER computer system has an input bandwidth of 5.4 Gbps and, at maximum capacity, can serve up to 10.8 Gbps of program material. The program information may be stored within the computer system's disk drive array, an off-line storage system such as an optical disk library, and/or is available from a real-time program feed (digital or analog).

The server 102 provides a plurality of time division multiplexed data streams, e.g., thirty-two, containing the information requested by the video session managers to service requests for a plurality of subscribers. These signals comply with the MPEG-2 standard for so-called "system streams" and "transport streams." These data streams are generally formatted into transport packets which comply with the MPEG-2 transport protocol or a similar transport protocol. The packetization and multiplexing process may be accomplished within the video session manager; however, the packetizing is more efficiently handled by an output subsystem of the server or the data can be pre-packetized and stored in the data storage devices associated with the server. As such, the server provides requested information in a plurality of transport streams having the information requested by many subscribers packetized and multiplexed into thirty-two independent streams. Each packet carries a TID of a requesting set top terminal and is presented to the video session manager on a particular output port, e.g., one of the 32 ports. Additionally, the server provides the high accuracy clock signal (reference signal) on path 103.

Alternatively, the plurality of data streams are multiplexed onto an optical cable and a "multidrop" technique is used to distribute the streams to the various video session managers. Specifically, a plurality of "drop lines" connect the video session managers to the optical cable (a trunk) and the streams are addressed to the appropriate video session manager.

To facilitate timing synchronization, the packets used to propagate the program information to the set-top terminals have a fixed length (i.e., a fixed duration). In essence, the packetizing process converts the time division multiple access (TDMA) streams into packet division multiple access (PDMA) streams. Consequently, the packet duration defines a fundamental unit of time for the system. As such, the start or end of each packet provides an accurate timing signal that can be utilized by the set-top terminals for synchronization.

C. The Video Session Manager 106

Figure 2:
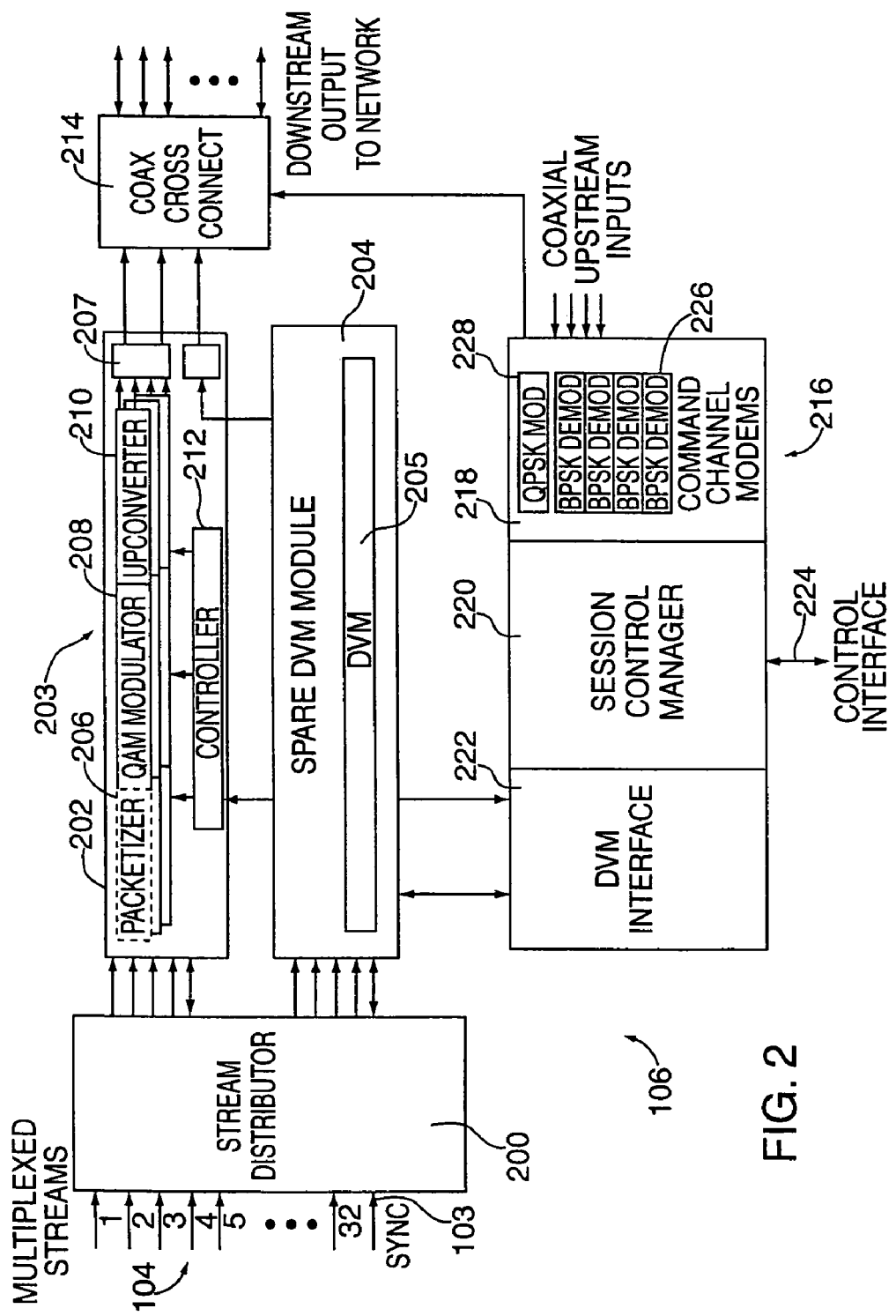
FIG. 2 depicts block diagram of a video session manager.

FIG. 2 depicts a block diagram of the video session manager 106. As mentioned above, the system generally uses multiple video session managers. Each manager provides information to up to 16 conventional cable transport network nodes ("neighborhood nodes") having up to 2000 subscribers each. Each video session manager distributes up to 320 different program streams to the nodes.

The video session manager 106 contains stream distributor 200, a digital video modulator (DVM) module 202 (also known as a DVM shelf) that contains a plurality of DVMs 203, a command and control module 216, and an output module (coax cross connect 214). The video session manager 106 also includes a spare DVM module 204 that contains a DVM 205 that can be substituted for any one of the DVMs 203 using a 1 for n sparing scheme. The stream distributor 200 routes the plurality of data streams from the server to all DVMs 203. Each DVM has two output ports that service one or two neighborhoods. Furthermore, each of the output ports may carry either one or two information channels. In this manner, the DVM module generates four digitally modulated channels that are independently frequency agile. The output combiner 207 combines the 4 channels into two pairs of two channels.

As mentioned with respect to the server description, the circuit cards of the video session manager 106 may contain a packetizer 206 (shown in phantom) such that the server provides time division multiple access system streams and the DVM packetizes the information into transport packets complying with MPEG-2 or some other transport protocol, i.e., a packet division multiple access data stream. However, to efficiently process the information streams, the server generally provides packetized data before supplying the data streams to the stream distributor 200. As such, the packetizer is not necessarily a portion of the DVMs.

Further, each DVM contains four modulators 208 that modulate each transport stream into a 64-ary QAM signal with block interleaving and forward error correction. The upconverter 210 then upconverts the QAM signal to a particular frequency for transport on the cable network, e.g., a frequency in the range 200 to 750 MHz is commonly used. Frequency selection and the modulation process is controlled by a controller 212 operating under control of the DVM interface 222.

Each of the DVMs (generally there are eight DVMs) modulates four data streams. The output module 214, e.g., a coax cross connect unit, combines the downstream information channel with the downstream command information produced by the controller module 216.

The controller module 216 contains a DVM interface 222, a session control manager (SCM) 220, and at least one control channel modem 218. The control interface 224 has a conventional VME bus architecture for communicating between the server and the video session manager. The DVM interface 222 has a conventional RS-482 serial bus architecture that interconnects controllers 212 for each DVM 203 and the session control manager 220. Other multipoint bus architectures, such as ETHERNET, may be substituted for the RS-482 and/or VME bus.

The control channel modems terminate the upstream and downstream control signals from/to the set top terminals. A single command and control modem can be used for each network node or a plurality of nodes, depending upon the communications traffic. Within each modem, the upstream demodulator is illustratively a binary phase shift key (BPSK) demodulator 226, while the downstream modulator is, for example, a quadrature phase shift key (QPSK) modulator 228. Of course, other modulation formats could be used. There are typically four upstream demodulators 230 for every downstream modulator 228.

The session control manager 220 is implemented using a commercially available microprocessor and operating system. The microprocessor must be fast enough to handle the control functions in real time.

In particular, the session control manager (SCM) 220 forms an interface to the set top terminals as well as the DVM modules 202 and 204 and the control interface (e.g., VME bus 112 in FIG. 1) 224. The SCM's responsibilities include set top terminal sign-on and time out, authentication, configuration, and control protocol termination; alarm management and frequency assignment; session security; service selection and control; event notification and usage metering; and a subscriber's access to account information. Commands and requests from the set top terminals are processed by the SCM and appropriate requests are made to the file server to perform certain information navigation and movie-on-demand functions.

Typically, there are nine DVMs (eight active modulators 202 and one spare 204) attached to and controlled by a single SCM. Physically, the DVM modules and the SCM are housed in a single rack. Each DVM module is assigned to the SCM by connecting its interface to an SCM's RS-482 controller (DVM interface 222) and entering the DVM RS-482 address in a configuration database of the RS-482 controller.

A DVM module configuration contains sixteen neighborhoods of set top terminals, each DVM services two neighborhoods using each of the DVM output ports. However, if one neighborhood is using the movie-on-demand service more than another, DVMs are removed from servicing one neighborhood and added to service the neighborhood with the higher demand, i.e., the DVMs are independently agile. The SCM simply keeps track of a number of "pools" of DVMs, the output of the DVMs in each pool being combined and broadcast. As long as the bandwidth is available on the upstream and downstream channels, DVMs may be dynamically moved from one pool to another.

The pools are additionally configured to allow only a subset of DVMs to be active simultaneously. The remaining DVMs are available as standbys and are automatically allocated when one of the active DVM's fails or is removed. Additionally, to increase subscriber service capacity, neighborhoods may run without a standby DVM module.

Figure 3:
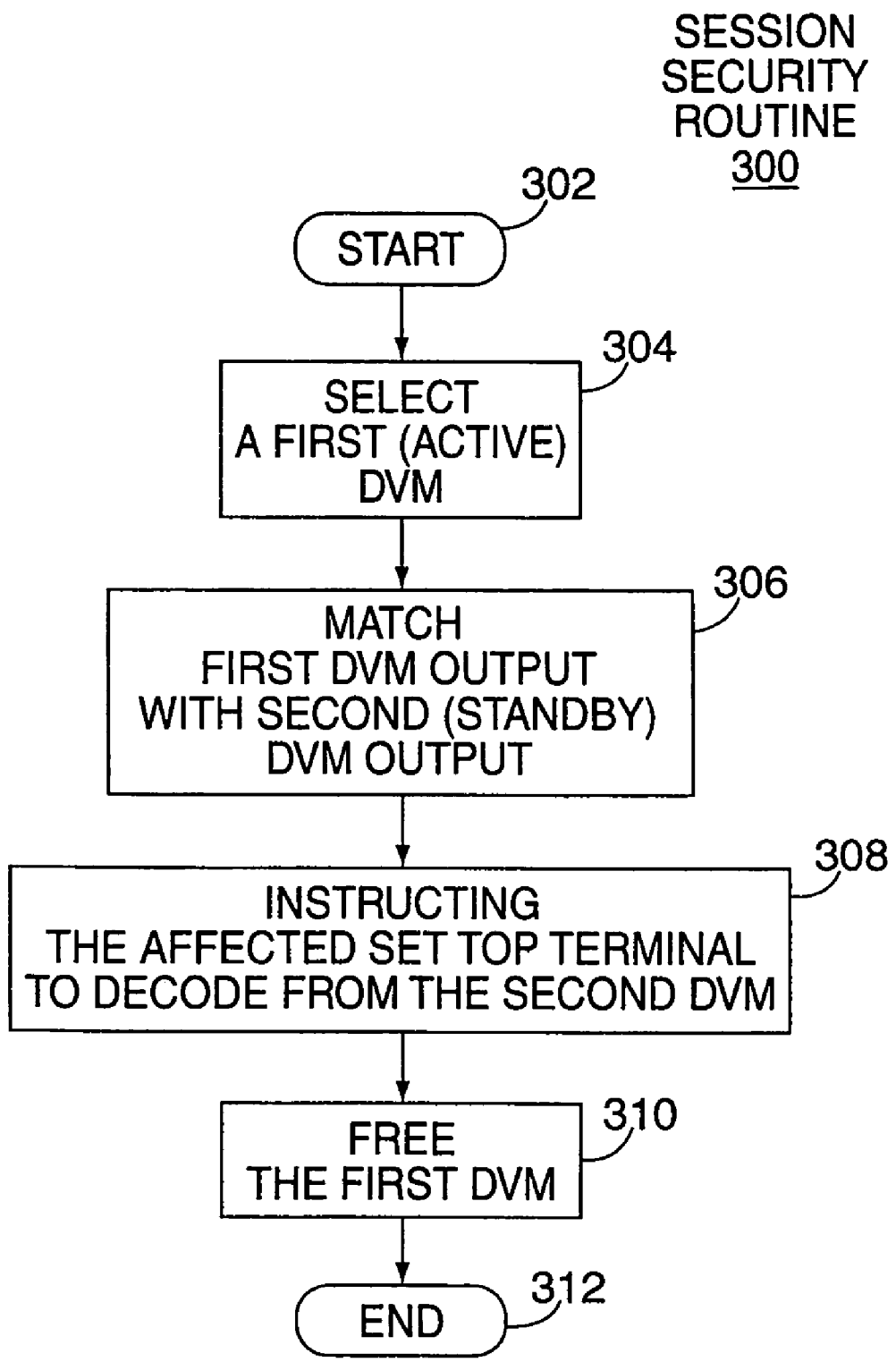
FIG. 3 depicts a flow diagram of a session security routine.

As one example of session security provided by the SCM, the SCM is capable of periodically changing the frequency of the DVM's output to make it more difficult for a non-subscriber to acquire free service. FIG. 3 depicts a flow diagram of this important feature of the invention. The session security routine 300 begins at step 302 and proceeds to step 304. The SCM selects, at step 304, an active DVM; matches, at step 306, its output on a standby DVM (but modulating at a different frequency); programs, at step 308, the affected set top terminal to decode from the new DVM location; and then frees, at step 310, the original DVM. The session security routine ends at step 312. This security measure requires the availability of a single free DVM frequency.

Returning to FIG. 2, a bus containing 32 transport streams (path 104) and a high accuracy clock signal (sync) (path 103) is provided from the file server. The synchronization clock is daisy chained through the DVMs within a rack. Each DVM is configured to extract one of the 32 transport streams for modulation. All of the data streams are synchronized to the synchronization clock signal. Furthermore, the DVM's all operate from a common frequency source that is phase-locked to the synchronization clock. As such, all DVM output streams are synchronized. DVM redundancy is performed by configuring the standby DVMs to extract the transport stream that was carried by a parallel active DVM and to modulate at the same frequency.

An SCM communicates with its set top terminals through a plurality of control channel modems (CCM) 218. A neighborhood is serviced by a single CCM, but a given CCM may service multiple neighborhoods as well. The set top terminals which are connected to a given CCM must contend for the upstream channel that is available for propagating control signals from the set top terminals to the CCM and SCM.

The CCM modulates transmitted data blocks onto the downstream command channel and demodulates received data blocks from the upstream back channel. The upstream bandwidth is roughly 50 kilobytes per second, while the downstream bandwidth is approximately 1 megabit per second. The CCM also provides a robust error detection and correction process.

The CCM is frequency configurable for both upstream and downstream channels. Upon installation of the system, the cable transport network is analyzed to locate the least noisy portion of the available spectrum. The set top terminals are then set to transmit and receive on the selected frequencies having the least noise. The CCMs are configured to use the frequencies programmatically from the SCM. The SCM interfaces to the CCMs through a SCM shelf backplane using a shared memory mailbox approach within the VME bus architecture. A simple reliable link protocol is applied in both directions resulting in guaranteed delivery of data packages.

Since there is only one CCM that transmits in the downstream direction, and the upstream and downstream paths are independent, downstream signal collision cannot occur. Therefore, the CCM may transmit whenever it has data to send. Similarly, every set top terminal simply transmits whenever it has data to send. No carrier sense or collision detection need be performed. When the CCM receives a message, it transmits an acknowledgment to the sending set top terminal. If the transmitting set top terminal does not receive an acknowledgment within the time it takes the packet to be transmitted, processed and acknowledged, the set top terminal assumes that the message was interrupted and not received. In that case, the set top terminal performs a random backoff and then retransmits the message. A sequence number per set top terminal is employed to prevent duplicate messages from being passed up to higher layers of the SCM software. Since collision detection is not performed, there is no relationship between the minimum packet size and the maximum distance between two nodes in the network.

A low frequency "keep alive" poll, on the order of every five minutes, is required by the set top terminals that have been powered off so that streams allocated on those DVMs can be released for use by other subscribers. The polling frequency determines the worst case length of time between a subscriber removing power and the SCM reallocating the stream and ceasing the subscriber billing function.

The command traffic from individual set top terminals is likely to be bursty. Subscribers enter command information to the set top terminal, interact for one or two minutes with the terminal, and then watch a movie for an extended period of time. The set top terminal is designed to wait for an acknowledgment long enough for the message to propagate upstream, be processed, and for an acknowledgment to propagate downstream. The set top terminal should wait for approximately 720 micro-seconds before performing the backoff and message retransmission after not receiving an acknowledgment. Illustratively, the backoff (a wait period) starts off small enough to resolve a transmission collision between messages from two set top terminals and increases exponentially to resolve a collision between sixty-four set-top terminals. If two set-top terminal transmissions collide, ideally, one should retransmit immediately and the other should retransmit after at least the worst case transmission delay, approximately 3 milliseconds. The backoff time is a multiple of the worst case transmission delay selected as a random number less than the maximum transmission delay, which doubles upon each successive collision.

The downstream command channel does not have collisions, but it is still subject to lost packets due to the network noise. Therefore, the set top terminal returns an acknowledgment whenever it receives a message from the CCM. If the acknowledgment is not received in the time it takes for the message to be transmitted, received, processed and an acknowledgment queued and transmitted, the message will be resent. Note, since there can be no collisions, a backoff period is not required.

Figure 4:
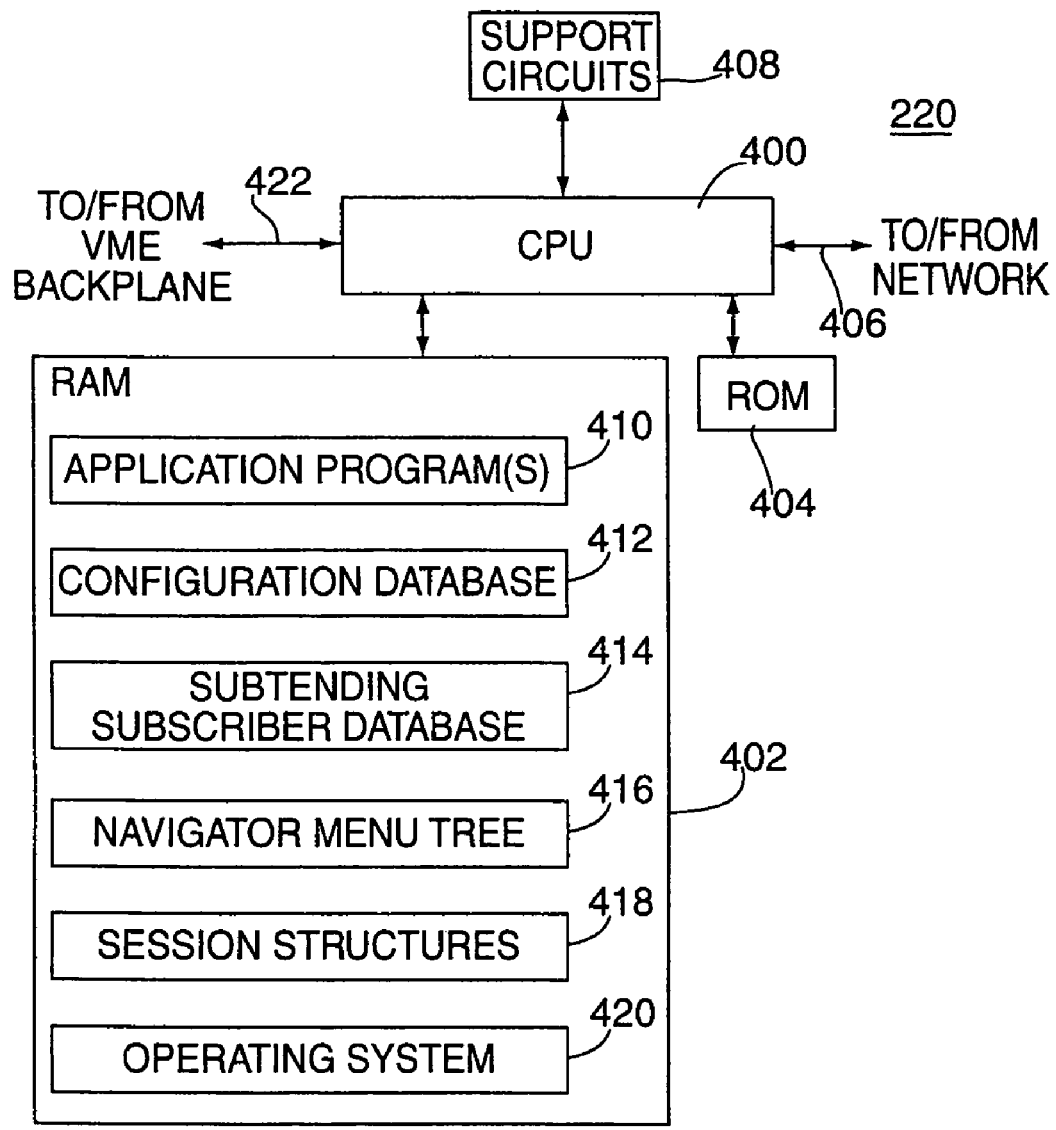
FIG. 4 depicts a block diagram of the video session manager computer.

FIG. 4 depicts a block diagram of the SCM hardware 220. This hardware contains a central processing unit (CPU) 400, random access memory (RAM) 402, read only memory (ROM) 404, an RS-482 interface 406, a VME backplane interface 422 and CPU support circuits 408 such as clock, cache, power supplies and the like. The RAM 402 contains an application program(s) 410, a configuration database 412, a subscriber database 414, a "navigator" menu tree 416, session structures 418, and operating system entities 420. All programming for the SCM is conducted using object oriented programs.

The subscriber database 414 provides information on a per subscriber basis. The database may or may not be downloaded as part of the configuration database 412. The subscriber database includes information regarding each set top terminal including one or more personal identification numbers (PINs), a terminal identification number (TID), present terminal state, and the like. Subscribers may modify their PINs using their set top terminals; therefore, subscriber objects such as PINs are capable of being written back to the database. A disclosure of an illustrative PIN management method and apparatus is disclosed in commonly assigned U.S. patent application Ser. No. 08/738,343 filed Oct. 25, 1996 and herein incorporated by reference.

The session database 418 is constructed by the SCM at run time. The SCM manages the sessions dynamically as they are created and destroyed. This database contains a different database structure for different session types. For example, a barker session that is initiated when a viewer tunes to a barker channel, is associated with a database containing the set top terminal ID that has been tuned to the barker and the state of the terminal. The state of the terminal describes the type of programming being processed by the terminal, i.e., analog mode, barker viewing (broadcast mode), navigator viewing, program viewing and the like. Also, a movie session produces a session database that contains the TID of the terminal viewing the movie, the terminal state, a PID, an expiration timer value indicating when the movie is expected to be complete, a use timer value indicating the duration of the session, the subscriber ID (e.g., PIN) and the like. Furthermore, for a navigator session, i.e., a session in which the subscriber is browsing the available information selections, the session database 418 contains a TID and its state as well as historical information regarding the browsing function.

The configuration database 412 describes how the hardware is configured, e.g., which DVMs are active or standby, available frequencies, terminal configuration information, DVM information and the like. The database is either downloaded or recovered from local non-volatile storage.

The navigator menu tree 416 is downloaded from the file server when the SCM boots. The tree consists of a set of variable length nodes and an index which provides the offset of a node given its identification number. The tree describes the particular pattern of navigator movements available to a subscriber and what programming is available to a particular subscriber as defined by that subscriber's PIN. For example, a subscriber having entered a PIN that provides "regular" viewing authorization would be able to use "navigator buttons" that facilitate browsing and preview of all non-adult material. As such, the menu tree structure utilized by this subscriber would not include branches to adult material. In contrast, a subscriber that enters a PIN which authorizes access to so-called "late night" programming utilizes a different tree structure than that used in regular viewing. The "late night" programming tree structure includes access to buttons that permit viewing of adult material. As such, each tree is activated on a subscriber-by-subscriber basis and defines the manner in which the navigator is executed for each subscriber. A detailed description of the navigator appears in commonly assigned U.S. provisional patent application Ser. No. 60/034,490 filed Jan. 13, 1997 and incorporated herein by reference.

The ROM 404 contains software that is capable of performing "power on self test" and booting a software image from a network. The ROM 404 is approximately 256 kilobytes. The non-volatile memory is programmed during manufacturing to store a network address, serial number, date of manufacture, and component revision levels. There is no requirement to save any other configuration information across a system boot.

The RS-482 interface has at least six ports with one port connected to the RS-482 network bus, one for the SCM and four for the DVM interface modules. The SCM CPU 400 is a 68K family microprocessor available from Motorola. Preferably, the microprocessor within CPU 400 is the 68040 enhanced 32-bit microprocessor having 8 kilobytes of cache, MMU and FPU, and running at a clock speed of approximately 25 to 33 MHz. Such a microprocessor including a VME bus interface, on-board RAM, a SCSI interface, non-volatile memory, communication ports, various clocks and timers, an RS-482 transceiver interface, and ROM is available on a single CPU circuit card as a model number MVME167 from Motorola. The card is installed in an NEBS compliant chassis. Alternatively, the MVME162 model circuit card also available from Motorola can be used. Either of these cards are plugged into a 20 slot VME backplane available from Motorola as part number MC1120.

A number of operating systems 420 are available for use by the hardware including the pSOS+ available from Integrated Systems, Inc., the Vx Works available from Wind River Systems, VRTX available from Microtec Research, Inc., QNX available from QNX Software Systems, Ltd., and OS/9 available from Microware.

As mentioned above, the SCM also maintains system synchronization from end-to-end, e.g., from server to set top terminal. The server has a high accuracy, level 1 clock that is provided to the stream distributor 200 in FIG. 2. Each of the clocks in the video session manager 106 are derived from this clock signal. The DVM clocks are used to retrieve data from stream distributor 200 and clock the data from the distributor as packets for modulation. Thus, all data is synchronized to the synchronization clock. The output bit rate is 10 MPEG-2 packets per second or 2.6998 Mbps. This is directly proportional to 29.97 frames per second of conventional video signals. Thus, the system clock is built into the bit stream. The same clock signal is used as the basis for modulating all data streams. As such, the same clock signal is sent to every set top terminal. The clock is extracted by the set top terminal (e.g., frequency and phase locked) to provide end-to-end system synchronization. Because of this end-to-end synchronization, conventional MPEG-2 transport circuitry is not needed to remove jitter by buffering the data. Thus, the set top terminal and the CCM are less complicated and less expensive. Additionally, a fully synchronized system permits switching from stream-to-stream without the need for resynchronization.

The system provides fixed multiplexing rates, i.e., 10 subrate server channels of 2.6998 Mbps, or less than 10 super rate channels, e.g., multiples of the 2.6998 Mbps. For special transmissions that require superior bandwidth, a program can be sent using a plurality of channels. For example, the bandwidth required to adequately present a basketball or football program is probably greater than the bandwidth required to adequately present a black and white movie.

The system is capable of dynamically allocating information channel resources to the subscribers. Allocation decisions are predicated on subscriber program requests and subscriber resource usage. For example, programs may be characterized according to program content during, e.g., a storage or pre-transmission operation. Such a characterization provides an indication of a necessary, desirable or optimal information channel resource level (i.e., bandwidth). A subscriber requesting a program requiring a high information channel resource level (e.g., a basketball game) will be allocated an additional subrate channel or a super rate channel (if available). A subscriber requesting a program requiring a low information channel resource level (e.g., a black and white movie) will be allocated fewer (or only one) subrate channels. If a subscriber having been allocated one or more subrate channels or a super rate channel terminates a session, the bandwidth released by the terminating subscriber may be re-allocated among the remaining active subscribers. Ideally, all subscribers receive programs with an optimal information channel resource level. The system monitors various loading parameters and makes resource allocation decisions in accordance with this ideal. When a session ends, the video session manager terminates the session and clears that particular session database. If pause is selected, after a delay (e.g., 2 minutes) the session is ended.

D. The Cable Transport Network 110

The cable transport network 110 of FIG. 1 is a conventional hybrid fiber-coax cable television (CATV) system having forward information channel (in-band upstream information channel) operating a 50 to 750 megahertz. This channel carries the broadband information to the subscriber set top terminal. The network also carries the forward command control channel (out-of-band upstream channel) operating at 50–750 MHz and a reverse or back channel (out-of-band downstream channel) operating at 5–42 MHz. The cable transport network further contains conventional receiver/bridger amplifiers and line amplifiers to insure that a high-quality signal is received by each of the set top terminals connected to the network. As such, the network is capable of supporting three uni-directional channels.

Although the cable transport network is illustratively described as a hybrid fiber-coax network, other network forms may be used such as all fiber, all coax, or any other broadband communications network that will support three unidirectional communications paths.

E. Set Top Terminal 118

The set top terminal 118 of FIG. 1 receives the QAM modulated signal from the cable transport network and demodulates the signal. The set top terminal demodulates and depacketizes the in-band QAM signal as well as demodulates the upstream control signals and modulates the downstream control signals.

Figure 5:
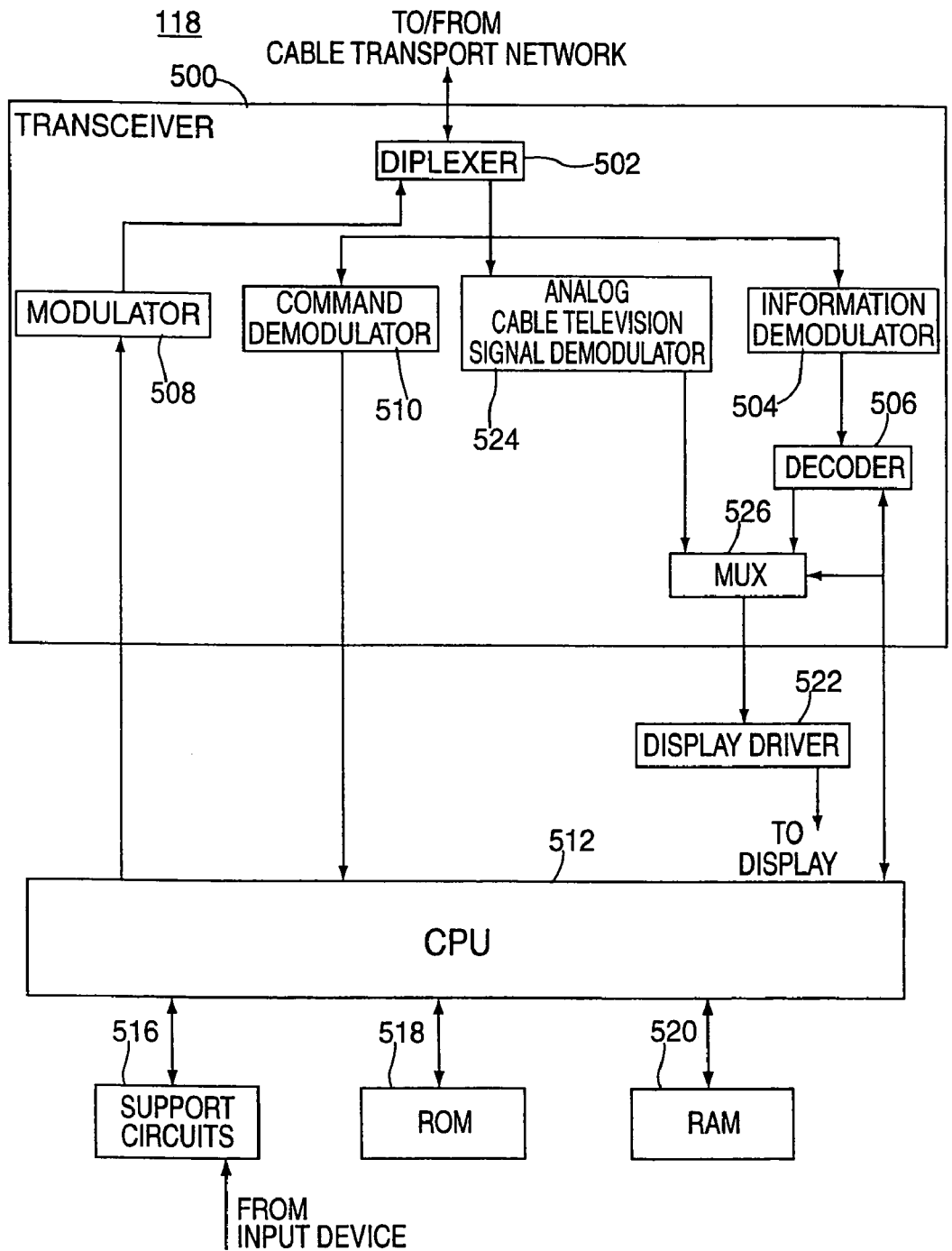
FIG. 5 depicts a detailed block diagram of a set top terminal.

In particular, FIG. 5 depicts a block diagram of the set top terminal 118 which contains a transceiver 500 a central processing unit (CPU) 512 and a display driver 522. The CPU 512 is supported by RAM 520, ROM 518 and various support circuits 516 such as clocks, power supply, an infra-red receiver and the like. The transceiver 500 contains a diplexer 502, a back channel modulator 508, an information channel demodulator 504, a command channel demodulator 510, an information decoder 506, a conventional television signal demodulator 524, and a multiplexer 526. The diplexer 502 couples the three channels carried by a single cable within the network to the modulator and demodulators. Each demodulator 504 and 510 tunes and downconverts the signals from the cable network in a conventional manner. The information channel demodulator 504 is a conventional QAM demodulator such as a model BCM3115 manufactured by Broadcom, Inc. Other such demodulators are well-known in the communications arts. However, this particular QAM demodulator also contains a built in "out-of-band" QPSK demodulator for handling command channel data carried by the forward command channel. As such, a single integrated circuit can process both subscriber requested information (audio and video) as well as command data.

The decoder 506 processes the data packets carrying subscriber requested information produced by the QAM demodulator into useable signals for the end user display, e.g., television, home studio, video recorder and the like. The data for display is conventionally processed by a display driver 522 to produce composite video as well as a conventional television signal.

The conventional cable television signal demodulator 524 contains a tuner and analog (NTSC) demodulator. A multiplexer 526 couples the demodulated analog or decoded video signal to the display drive 522.

The demodulated QPSK signal provides command and control information to the CPU 512 for generating certain graphics and control interface regions upon a television screen. The CPU is, for example, a Model 68302 processor manufactured by Motorola. This processor, operating in combination with the decoder 506, produces screen displayed "buttons" or regions with which a subscriber interacts using an infrared remote control 120.

Specifically, a joystick on the remote control highlights selectable regions or icons on the television screen. When a particular icon is highlighted, the subscriber depresses a "select" key on the remote that sends an infrared signal to an infrared receiver (a support circuit 516). This receiver sends the command to the CPU for interpretation. If the command is a request for a local function to be implemented, e.g., volume control, the CPU performs the function locally. However, all non-local functions that involve requesting information or manipulating the presentation of the information are communicated to the service provider. As such, the processor formats the command and sends it to the back channel modulator for transmission to the video session manager.

The available non-local session control commands are infinitely variable including, but not limited to, information select, play, stop, rewind, forward, pause, and the like. The control commands are sent via a BPSK modulator 508 and an imbedded transmitter through the back channel to the CCM. The CCM demodulates and couples the command to the SCM which implements the command. The operation of the navigator which facilitates finding, communicating, and controlling the information is disclosed in commonly assigned U.S. provisional patent application 60/034,490 filed Jan. 13, 1997.

Many of the above teachings are utilized in an interactive digital video on demand (VOD) service known as the OnSet™ system, which is manufactured by DIVA Systems Corporation of Menlo Park, Calif. The OnSet™ system distributes audio-visual information to subscribers utilizing MPEG-like information streams. The OnSet™ system also allows subscribers to interactively control the delivery of audio-visual information using consumer-friendly commands, such as fast-forward (FF), rewind (REW), pause (PAUSE), play (PLAY) and the like. Additionally, the OnSet™ system utilizes an on-screen electronic program guide (i.e., a "navigator") that provides appropriate means for user selection of titles for viewing.

In order to support such user interactivity, the concept of an open session has been implemented within the system. When a title is purchased an open session is created. The open session is associated with the account that purchased the title and stores the current use and view time available for a title. The view time is the actual amount of time the title is available for a user to watch a title. The use time is the actual time a user is allowed to physically watch a title. For example, the use time may be two times the length of the title and the view time may be 24 hours, meaning a title can be watch a total of two times in the next 24 hours. The maintenance of the open session is a joint effort between the video session manager (VSM) 106 and the network management system (NMS) 114 described above with respect to FIG. 1.

It is desirable to provide for the sharing of titles between set top boxes belonging to the same account, or allowing a user to stop watching a title on one set top box and begin watching it on another. It is also desirable for a user having multiple set top terminals to migrate or share the use of an open session from one terminal to another. Apparatus and methods for providing such a session migration or use sharing capability within the above-described system will now be discussed. Specifically, apparatus and methods allowing multiple set top terminals linked to a single account (e.g., in a user's home) to share the same program and to interact in an appropriate manner will now be described.

FIG. 6 depicts a plurality of data objects useful in understanding the invention. Specifically, FIG. 6 depicts a subscriber table 610, a session table 620 and a display control unit (DCU) table 630. The subscriber table includes information associated with a particular subscriber, such as the subscriber's account number 611, name 612 and other data 613. The session table 620 includes information associated with a particular open session, including the account number 621 associated with the open session, the session number 622 of the open session, the use time 623 (i.e., the actual time a user is allowed to physically watch a title), the view time 624 (the actual amount of time that the title is available for a user to watch), a position indicator 625 (indicative of the present position or "bookmark" of the title being viewed)

and other data 626. The DCU table 630 includes the account number 631 of the subscriber, a serial number 632 and other data 633.

Figure 7:
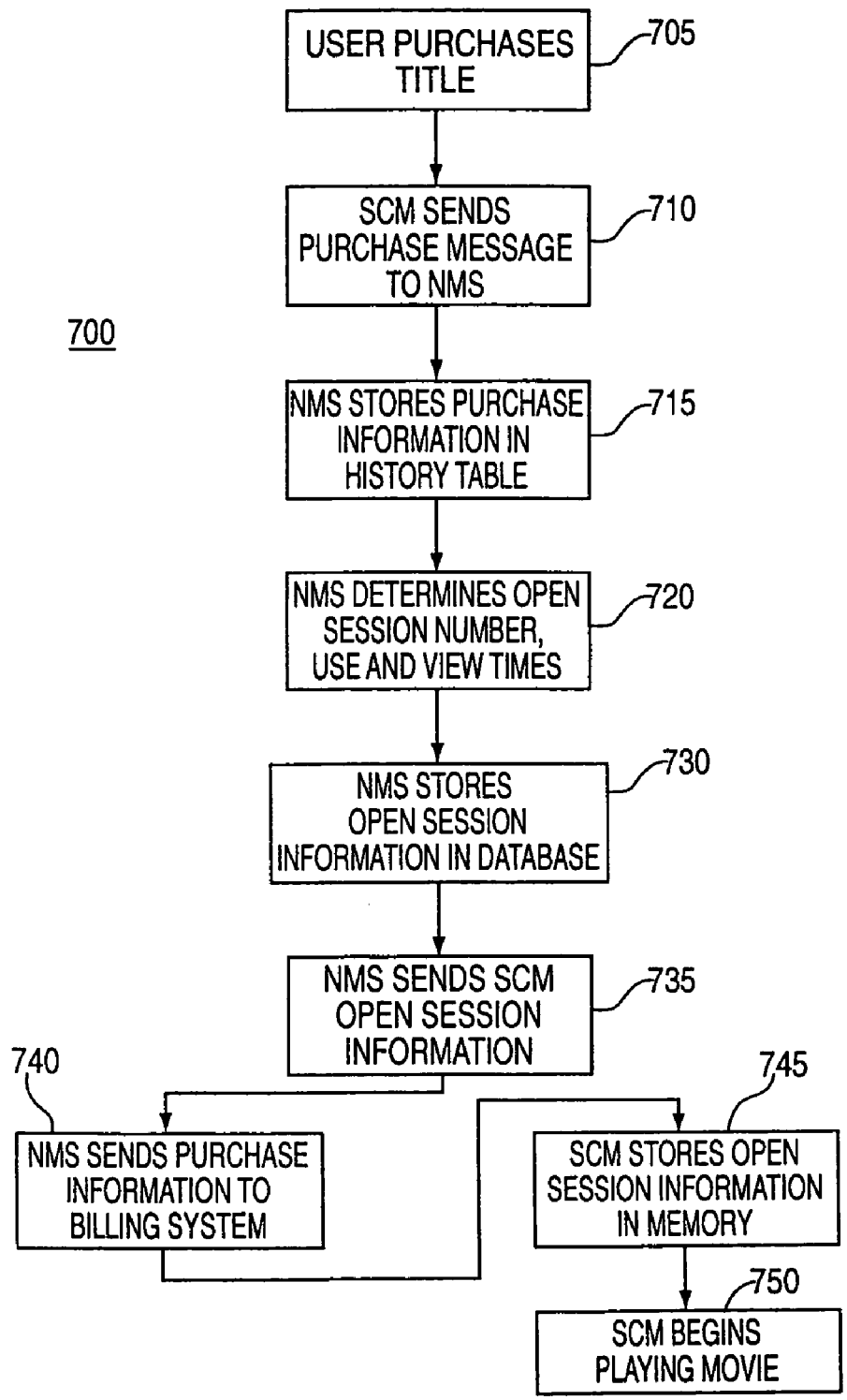
FIG. 7 depicts a flow diagram of a method for opening a session.

FIG. 7 depicts a flow diagram of a method for opening a session. Specifically, the method 700 of FIG. 7 depicts an exemplary series of tasks performed by the session control manager (SCM) 220 of the video session manager (VSM) 106 (see FIG. 2 and associated text), and the network management system (NMS) 114 (see FIG. 1 and associated text) in response to the purchase of a title, illustratively a movie, by a user.

The method 700 of FIG. 7 is entered at task 705 when the user purchases a title by, e.g., interacting with the system via the user's set top terminal (e.g., via a Navigation interface or other means). The purchase of a title includes the selection of a title, any explicit terms of use (i.e., extended viewing time or use time) and any other purchase terms. The method 700 then proceeds to task 710.

At task 710 the session control manager sends a purchase message to the network management system. The method 700 then proceeds to task 715, where the network management system stores the purchase information in a history table associated with the purchase. The method 700 then proceeds to task 720.

At task 720, the NMS determines an open session number 622, a use time 623 and a view time 624. The use time and view time are determined in accordance with, e.g., a default value (e.g., twice the title length time for use and 24 hours for view) or a selected use and/or view time requested by the user when purchasing the title (during task 705). The open session number 622 is simply a unique identifier for the session being opened for the purpose of delivering the purchased information stream to the user. The method 700 then proceeds to task 730, where the NMS stores the open session information in a database. That is, the NMS stores the session number 622, use time 623, view time 624 and account number 621 associated with the purchasing user in a session table 620. The method 700 then proceeds to task 735.

At task 735 the network management system sends the open session information to the session control manager, and to task 740 where the NMS sends purchase information to the billing system. The method 700 then proceeds to task 745, where the session control manager stores the open session information in memory as, e.g., the various data elements 621 through 626 depicted in FIG. 6 with respect to the session table 620. The method 700 then proceeds to task 750, where the session control manager begins playing the movie or otherwise distributing the purchased information stream to the user.

The above-described method for responding to a user purchase (or request) for an information stream results in the creation of an open session. The open session may be terminated in several ways. For example, the user may expressly terminate an open session, the use timer (or view timer) may run down to zero or the SCM and/or NMS may administratively cancel or suspend an open session due to, e.g., non-payment of a user's bill or an accumulation of open sessions beyond a threshold level.

Figure 8:
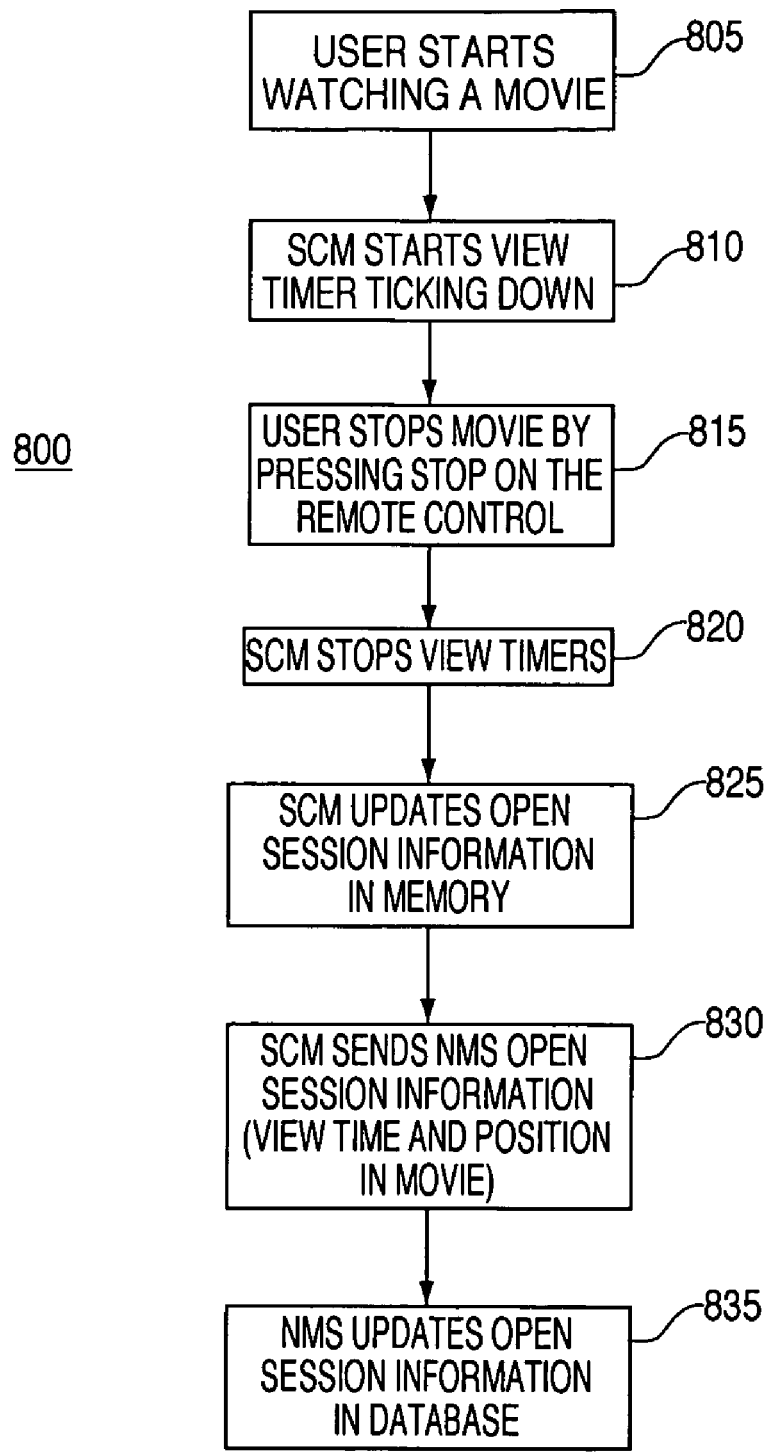
FIG. 8 depicts a flow diagram of a method for responding to a "stop" request.

FIG. 8 depicts a flow diagram of a method for responding to a "stop" request. Specifically, the method 800 of FIG. 8 depicts an exemplary series of tasks performed by the SCM 220 and NMS 114 in response to a "stop" or "pause" request received from a user during an open session, such as initiated in task 750 of the method 700 of FIG. 7.

The method 800 of FIG. 8 is entered at task 805, where a user begins watching a movie or other purchased information stream. For example, a method 800 of FIG. 8 is entered after the session control manager begins playing a movie (task 750 of FIG. 7). The method 800 then proceeds to task 810.

At task 810 the SCM starts a count down of an accumulator or memory location associated with the view timer 624 for the open session conveying the requested movie or information stream to the user. The method 800 then proceeds to task 815.

At task 815 the user requests that the presentation of the movie or information stream be stopped, by, e.g., pressing a stop button on a remote control device. The stop command is transmitted to the information server via, e.g., the back channel in the manner previously described with respect to FIGS. 1–5. The method 800 then proceeds to task 820.

At task 820 the SCM stops the count down of the accumulator or memory location associated with the view timer 624. The method 800 then proceeds to task 825, where the SCM updates the open session information in memory. That is, the accumulator or memory location associated with the view timer 624 is used to update the view time indicator 624 of the session table 620 such that the remaining view time is stored in the session table 620. The method 800 then proceeds to task 830.

At task 830 the SCM sends the NMS open session information (i.e., remaining view time and present information stream position). The method 800 then proceeds to task 835, where the NMS updates the open session information in the database.

The above described method 800 of FIG. 8 depicts the response of the session control manager to a user stop or cease transmitting command. Such a user command implicates two session table parameters, namely the view time 624 and information stream position 625. The view time 624, which indicates the amount of time that a viewer is allowed to view a particular information stream, is normally decremented as the viewer watches the information stream being presented. In response to the stop command, the decrementing of the view time indicator 624 is also stopped. Additionally, an information stream position parameter, i.e., a "bookmark") is stored in the session table 620, such that a subsequent resumption of the information stream presentation may begin at the point of cessation.

Figure 9:
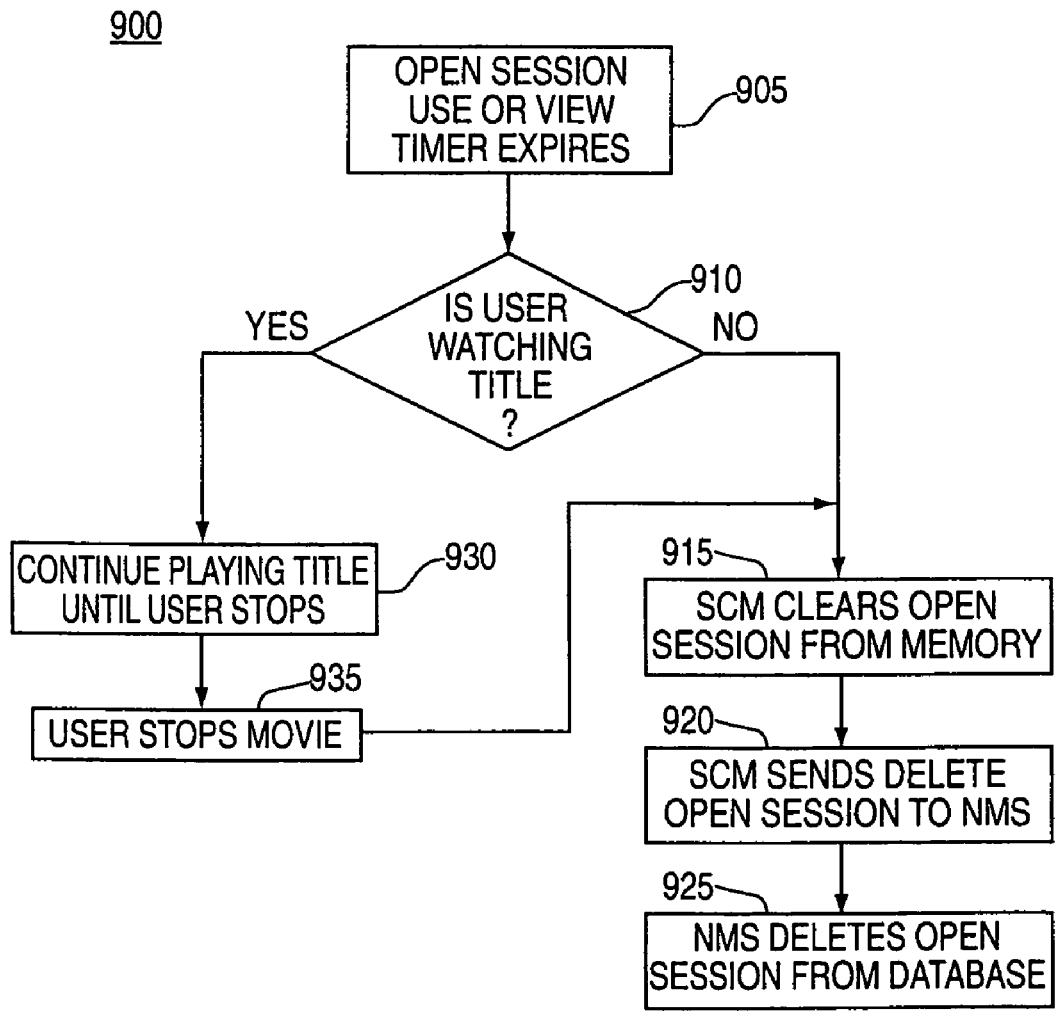
FIG. 9 depicts a flow diagram of a method for responding to the expiration of a timer during an open session.

FIG. 9 depicts a flow diagram of a method for responding to the expiration of a timer during an open session. Specifically, FIG. 9 depicts a method 900 for responding to the expiration of a use timer or view timer during an open session.

The method 900 of FIG. 9 is entered at task 905, where the open session use timer or view timer expires. The method 900 then proceeds to task 910, where a query is made as to whether the user is presently watching the requested title. That is, a query is made as to whether a requested movie or information stream is currently being presented or utilized by the user. If the query at task 910 is answered negatively, then the method 900 proceeds to task 915. If the query at task 910 is answered affirmatively, then the method 900 proceeds to task 930.

At task 930 the session control manager allows the presently open session to continue until the user stops the session or the movie/information stream presentation concludes, at which time the method 900 proceeds to task 915.

At task 915 the session control manager clears the open session from memory. That is, at task 915 the open session formed during the method 700 of FIG. 7 is torn down. The method 900 then proceeds to task 920, where the SCM sends a "delete open session" command to the NMS, and to task 925, where the network management system responsively deletes the open session from its database. That is, the session table 620 data structure described in FIG. 6 is deleted from the network management system database. Thus, the method of FIG. 9 provides that the presentation of a movie to a user will not be terminated upon the termination of the use timer or view timer, until the user terminates the presentation or the movie concludes.

Figure 10:
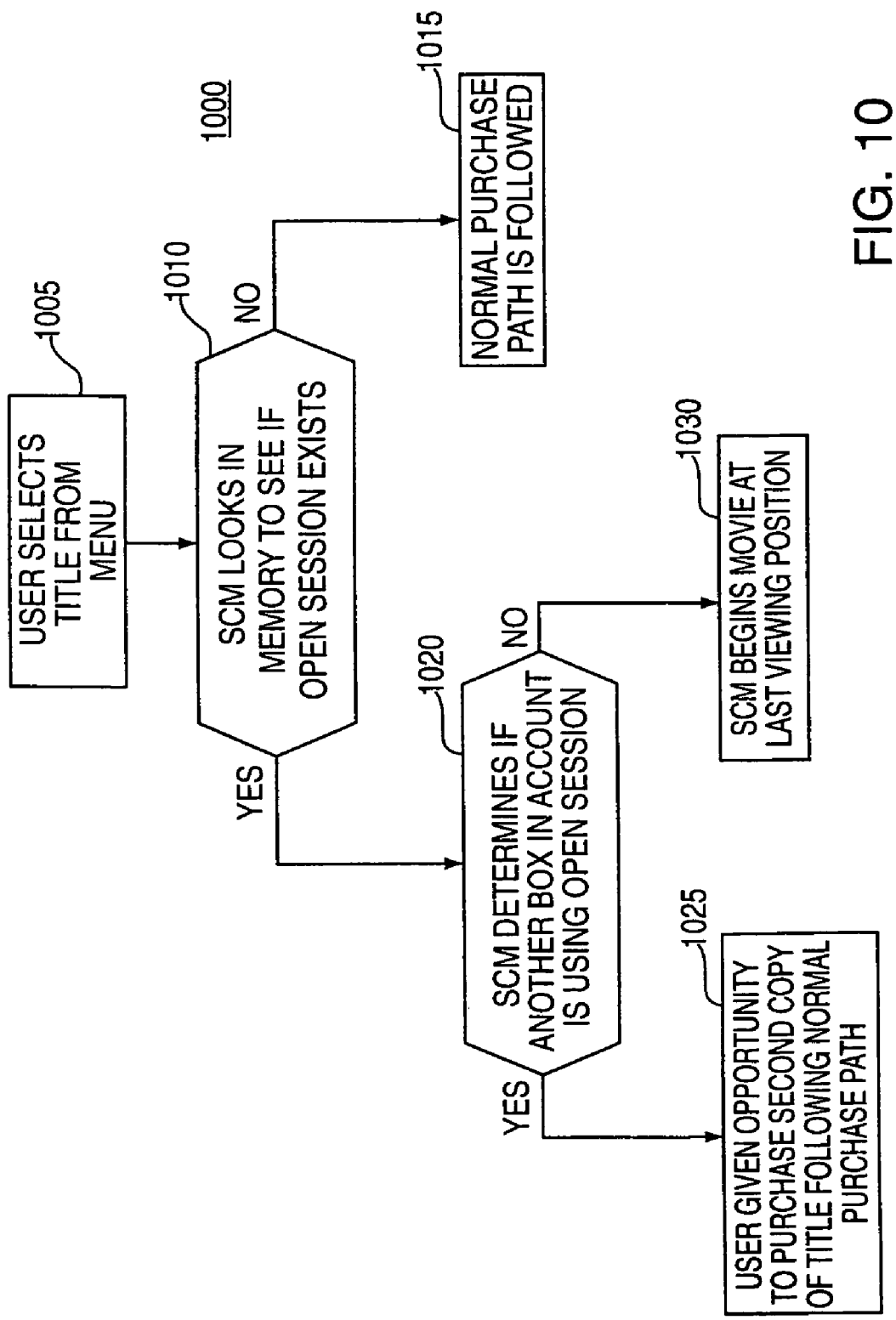
FIG. 10 depicts a flow diagram of a method for responding to the selection of a title within a multiple set top terminal environment.

FIG. 10 depicts a flow diagram of a method for responding to the selection of a title within a multiple set top terminal environment. Specifically, FIG. 10 depicts a method 1000 for responding to the selection, by a user, of a title for presentation within the context of a multiple set top terminal environment where the selected title may be presently associated with an open session for that user's account number.

The method 1000 entered at task 1005 when a user selects a title from a menu, such as a navigator display menu, displayed on the user's display device. That is, in task 1005 a user or subscriber selects a movie or other information stream for viewing and/or presentation on a set top terminal presently being controlled by the user. The method 1000 then proceeds to task 1010.

At task 1010 a query is made as whether an open session exists. That is, the session control manager examines its memory to determine if an open session exists with respect to the particular user identified by the account number 611 or 621. If the query at task 1010 is answered negatively (i.e., an open session with the user does not exist), then the method 1000 proceeds to task 1015, where the normal purchase path is followed (e.g., the method 700 described above with respect to FIG. 7. If the query at task 1010 is answered affirmatively, i.e., an open session with the user exists), then the method 1000 proceeds to task 1020.

At task 1020, a query is made as to whether another set top terminal associated with the user's account is using the open session. That is, a query is made to determine if another set top terminal associated with the same account number is viewing or presenting the same movie or information stream requested by the user at task 1005. If the query at task 1020 is answered negatively, then the method 1000 proceeds to task 1030. If the query at task 1020 is answered affirmatively, then the method 1000 proceeds to task 1025.

At task 1030 the session control manager begins playing or streaming the movie or information stream at the last viewing position (i.e., per the position indicator 625 of the session table 620).

At task 1025 the user is given an opportunity to purchase a second copy of the title following the normal purchase path. That is, since an open session exists (e.g., someone in the user's household is watching the requested movie on another television set), the user is given the opportunity to purchase a second copy of the requested title. The procedure for purchasing a copy is the substantially the same as described above with respect to FIG. 7. Optionally, since the user is purchasing a second copy of the same title, the user may be provided with a discount or other incentive such that the user is more inclined to make a purchase than to walk to another room or, in the case of sufficient remaining session view time, wait until the other viewer is finished before viewing the movie.

It must be noted that the method 1000 of FIG. 10 provides for two set top terminals associated with the same account number to have respective open sessions providing the same movie or other information stream at the same time. The two open sessions are distinct in their respective presentations of the requested movie, there is no requirement for simultaneous viewing of the same material (i.e., not a single video stream) or any link between the two streams other than for billing purposes, if necessary.

Figure 11:
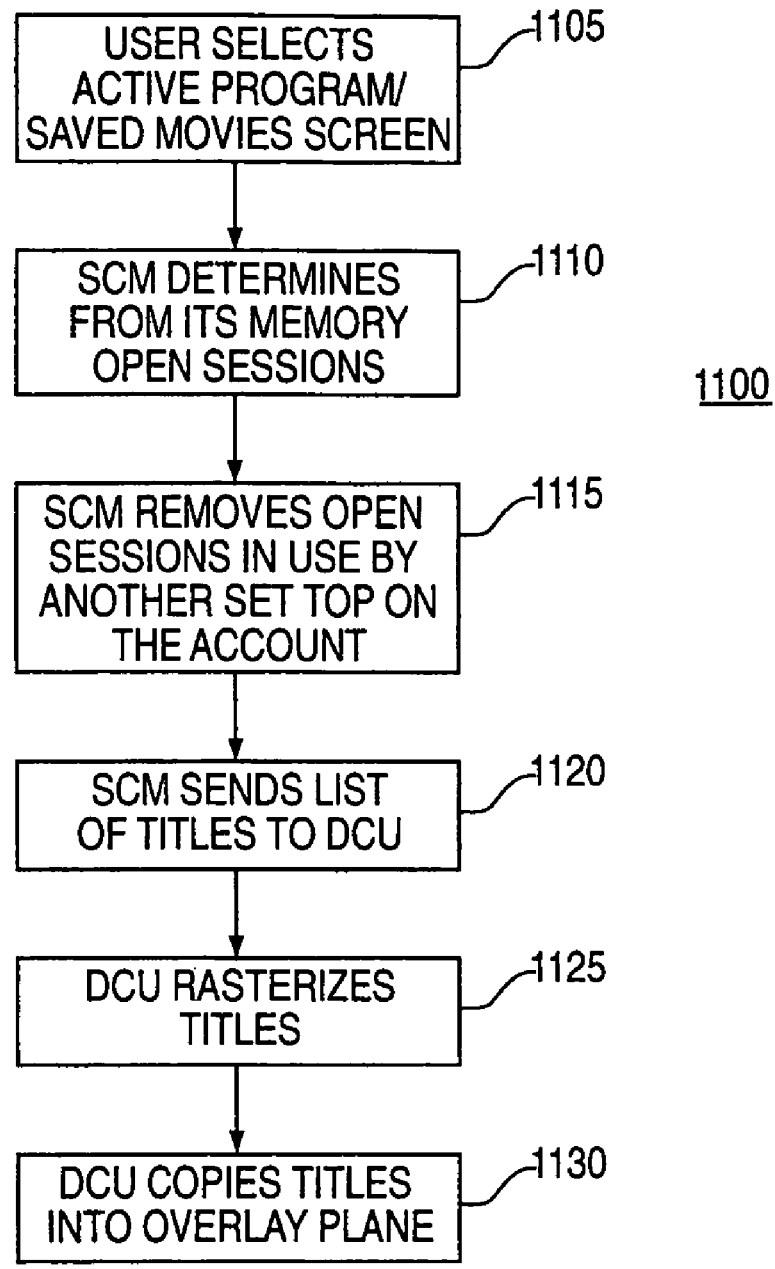
FIG. 11 depicts a flow diagram of a method for updating an active program screen within a multiple set top terminal environment.

FIG. 11 depicts a flow diagram of a method for updating an active program screen within a multiple set top terminal environment. An active program screen (or saved movie screen) comprises a list of movie or information stream titles previously selected by a user that are, presumably, associated with respective open sessions billed against the user's account number. The active program screen is displayed upon the user's display device such that the user may select a presently open (i.e., "active") session for presentation, e.g., finish watching a movie before the use timer expires. Therefore, the active programs comprise movies or other information streams that the user has paid for and has not fully utilized.

The method 1100 is entered at task 1105 when a user selects, via, e.g., a Navigator screen, the "active program" or "saved movies screen." The method then proceeds to task 1110.

At task 1110 the session control manager, in response to the user selection at task 1105, determines which sessions associated with the user's account number are, in fact, open. For example, the session control manager may examine all of the existing session tables (620) that include a user account number (621) that is the same as the users account number (611) and have use timer (623) and view timer (624) parameters that have not yet expired. The method 1100 then proceeds to task 1115.

At task 1115 the session control manager removes any open sessions in use by another set top terminal associated with the user's account. That is, the SCM removes from the "active program list" any of the open sessions determined at task 1110 that are presently being viewed by, e.g., someone using another set top terminal associated with the user's account number. The method 1100 then proceeds to 1120.

At task 1120 the session control manager sends a list of active titles to the display control unit of the set top terminal. The method 1100 then proceeds to task 1125, where the display control unit rasterizes the titles (i.e., converts the list of titles into a displayable format) and to task 1130 where the rasterized titles are copied into an overlay plane. The overlay plane may comprise, e.g., an onscreen display processor plane, a picture in picture image, a graphic or video overlay image and the like. All that is required is that the display control unit provides to the user an image comprising at least a list of active programs or active sessions associated with the user's account number. The user may then select one of the active titles for presentation.

Figure 12:
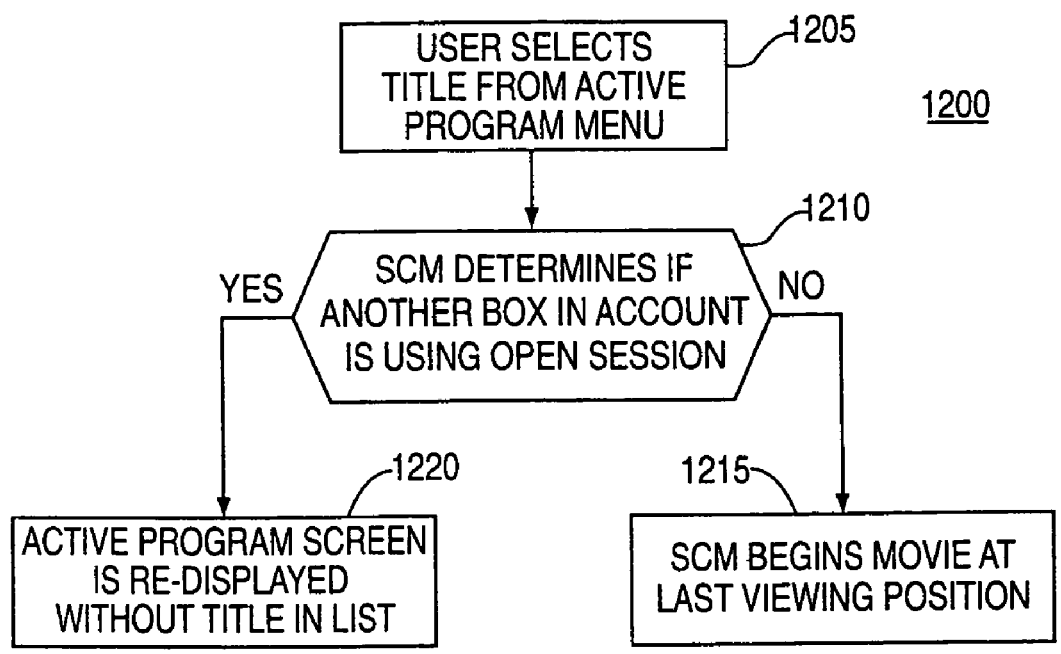
FIG. 12 depicts a flow diagram of a method for responding to the selection of an active title within a multiple set top terminal environment.

FIG. 12 depicts a flow diagram of a method for responding to the selection of an active title within a multiple set top terminal environment. Specifically, FIG. 12 depicts a method 1000 for responding to the selection, by a user, of a title from an active program screen for presentation.

The method 1200 of FIG. 12 is entered at task 1205 when the user selects a title from an active program menu, such as described above with respect to FIG. 11. The method 1200 then proceeds to task 1210.

At task 1210 a query is made to determine if another set top terminal associated with a users account using an open session.

If the query at task 1210 is answered negatively (i.e., no other session is associated with the selected title), then the method 1200 proceeds to task 1215, where the session control manager begins streaming the selected movie or information stream from the last viewing position, as indicated by the position field 625 of the session table 620.

If the query at task 1210 is answered affirmatively (i.e., another session is associated with the selected title), then the method 1200 proceeds to task 1220, where the active program screen is redisplayed without the selected title in the list. That is, since another set top terminal associated with the users account (e.g., the second set top terminal in another room) is viewing the selected title, the user may not utilize the active program menu to begin viewing the selected title at the last position (without, e.g., additional payment). Thus, the method 1200 of FIG. 12 depicts the active program screen being redisplayed without that title. Alternatively, should the user wish to view that program, the user may select a title in the manner previously described with respect to FIG. 7.

The methods described above with respect to the various figures enable the interactive information distribution system to provide a session migration or use sharing function to a user. To summarize, a first user interacting with the system on a first set top terminal moves through a menu structure to purchase a title. Once purchased the first user watches the title. While watching the title, the first user has access to video control features such as fast forward, rewind, pause and stop. When the first user selects stop on a remote control, a "stop" message is sent from the first set top terminal to the VSM. The VSM in turn sends a message to the video server to request that the video stream stop streaming. The video server stops playing the current video and returns to the VSM the user's current position within the video stream. The VSM stores the current position, i.e., a bookmark, in its memory for open sessions and sends the bookmark position to the NMS to store in the database. The book mark position is stored in the open session table associated with the account that the first set top terminal belongs too.

At a later time using the OnSet™ navigator on a second set top terminal, the first user moves through the menu structure to a menu selection "Active Programs/Saved Movies" that lists previously stored movies. The VSM uses the information stored in its memory to determine the list of titles that are still available to be viewed by the account that the second set top terminal belongs to. The determination of what titles are available to an account is done by the VSM looking into its memory of open sessions for a particular account and, from that list, removing any titles that are currently being viewed by other set top terminal(s) within that account. The VSM sends the list of titles to the second set top terminal to display on the screen. The user uses his remote to select the title previously viewed on the first set top terminal. The second set top terminal sends a message to the VSM indicating the selected title. The VSM receives the message, looks into memory for the current position of the title, and sends a message to the video server to begin playing the title at the position stored in memory. The video server begins to play the video and the user views the title from the position they last stopped the movie.

The strategy used above to share titles between two set top boxes is not limited to two set top boxes. The system supports more than two set top boxes per account and uses the same strategy for sharing titles between all of the set top boxes.

In addition to being able to produce and display a list of all of the current "active/saved" titles that are available to a set top at a given time, the system will also determine if a title is part of the active/saved list when a title is purchased from any menu list. This is accomplished by the VSM checking its memory on every purchase of a title to see if the selected title is stored in the "active/open session" list. If the title is in the open session list, and the title is not currently being viewed by another set top box, the delivery of the movie or information stream is started from the previous stop position. By checking the open session list, even when a title is not selected from the saved movie screen, the VSM eliminates the user being billed a second time simply because they were not aware that another person in the home already purchased the title.

Preferably, the system optionally does not allow simultaneous multiple set top boxes access to the same title that is stored in saved movies, though this may be easily changed. If a set top terminal is currently viewing a title that is in the active/saved programs list, the VSM will not display the title on the saved movie screen. In addition to not showing the movie on the saved movie screen, the VSM will display a Movie Information Screen to the user upon the second selection of the title from a menu list. The movie information screen will display the price of the movie, which allows the second user to purchase another copy of the title and, therefore, open a second session for that title.

The implementation of the system as described above, allows multiple set tops to share a purchased title between them, in addition there is nothing prohibiting two set tops from simultaneously viewing the same title, each with their own control over fast forward, rewind, pause and stop.

It must be noted that the term "set top terminal" as used herein is defined broadly to mean any device capable of performing the subscriber equipment functions described herein, such as receiving information from an information server and transmitting information to an information server. For example, a set top terminal may comprise a device mounted within or without a television or display device, a chip set or application specific integrated circuit (ASIC) or general purpose computer(s) or other device(s) programmed or adapted to function as an information receiver and/or transmitter.

Although various embodiments which incorporate the teachings at the present invention have been shown and described in detail herein, those skilled in the art can readily devise many other varied embodiments that still incorporate these teachings.

What is claimed is:

1. In an interactive information distribution system utilizing an open session to provide requested information, a method comprising:
   (a) receiving a title selection request from a set top terminal; and
   (b) if the title selection request is an initial request for said title by said set top terminal, performing the steps of:
      opening a session with said set top terminal including determining, at a network management system, a use time associated with said requested title;
      sending the determined use time to a session control manager;
      monitoring, at said session control manager, said use time associated with said requested title;
      streaming said requested title to said set top terminal for display within constraints of said use time; and
   (c) if the title selection request is a subsequent request for said title of a previously terminated session with said set top terminal existing, performing the steps of:
      restoring said terminated session; and
      providing said requested title to said set top terminal if said use time associated with said requested title has not expired.

2. The method of claim 1, wherein step (b) further comprises the step of:
   associating a view time with said requested title.

3. The method of claim 2, wherein at step (c) said requested title is not provided to said set top terminal if said view time associated with said requested title has expired.

4. The method of claim 1, wherein step (c) further comprises the steps of:
   opening a new session with said set top terminal if said use time associated with said requested title has expired;
   associating a new use time with said requested title; and
   providing said requested title to said set top terminal.

5. The method of claim 3, further comprising:
   (d) opening a new session with said set top terminal if said view time associated with said requested title has expired;
      associating a new use time and a new view time with said requested title; and
      providing said requested title to said set top terminal.

6. The method of claim 1, wherein at step (c) said selected title is provided to said set top terminal beginning at a previous termination point.

7. The method of claim 1, wherein at step (c) said selected title is provided to said set top terminal beginning at a title start point.

8. The method of claim 1, wherein:
   said set top terminal has associated with it an account, said account being billed for providing said requested title to said set top terminal; and
   said use time defines the time within which said requested title may be accessed by said set top terminal without incurring an additional billing charge.

9. The method of claim 1, wherein:
   said set top terminal has associated with it an account, said account being billed for providing said requested title to said set top terminal; and
   said view time defines the amount of time that said requested title may be presented by said set top terminal without incurring an additional billing charge.

10. The method of claim 1, further comprising the step of:
    (d) terminating an open session in response to said use time associated with said requested title being expired.

11. The method of claim 10, wherein said open session is terminated at step (d) only after said set top terminal has concluded presenting said requested title.

12. The method of claim 10 wherein said open session is terminated at step (d) only after said set top terminal has requested that the providing of said requested title be halted.

13. The method of claim 2, further comprising:
    (d) terminating an open session in response to said view time associated with said requested title being expired.

14. The method of claim 13, wherein said open session is terminated at step (d) only after said set top terminal has concluded presenting said requested title.

15. The method of claim 14, wherein said open session is terminated at step (d) only after said set top terminal has requested that the providing of said requested title be halted.

16. The method of claim 2, wherein:
    said view time is incremented while said requested title is presented by said set top terminal, said incrementing of said view time being halted in response to receiving a command indicative of a halt to said presentation.

17. The method of claim 16, wherein said command indicative of a halt to said presentation comprises one of a stop command and a pause command.

18. The method of claim 2, wherein:
    said view time is incremented while said requested title is presented by said set top terminal, said incrementing of said view time being halted in response to receiving a command causing said providing of said requested title to said set top terminal to cease.

19. The method of claim 1, wherein said receiving a title selection request comprises:
    providing a menu including at least one title from provider equipment of said information distribution system to said set top terminal, where a user is enabled to select said at least one title.

* * * * *